3,167,474
COMPOSITION FOR COMBATTING COCCIDIOSIS AND METHOD OF USING SAME

Guy Hagemann, Nogent-sur-Marne (Seine), France, assignor to Roussel-UCLAF, S.A., Paris, France, a corporation of France
No Drawing. Filed May 28, 1963, Ser. No. 283,688
Claims priority, application Great Britain, June 8, 1962, 22,300/62
4 Claims. (Cl. 167—53)

The invention relates to novel ingestible compositions for combatting coccidiosis in animals containing di-lower alkyl dithiocarbamic acids or their alkali metal salts. The invention also relates to a novel method of treating animals to reduce the incidence of coccidiosis.

Coccidiosis which is caused by protozoa is a widespread infection in animals, particularly in poultry, rabbits and bovines. Acute and chronic coccidiosis of poultry, for example, may be caused by *Eimeria tenella* (infection of the coecum of chickens), *Eimeria necatrix* (infection of the small intestine of chicken), *Eimeria meliadigris* and *Eimeria adenoides* (coccidiosis of turkeys). The grave economic consequences of this infection to the poultry industry has caused permanent research for compounds capable of preventing the infection.

Examples of known coccidiostats are nitrofurazone (5-nitro-2-furaldehyde - semicarbazones), nitrophenide (m,m'-dinitro diphenyl-disulfide), sulfaquinoxaline, furazolidone [N-(5-nitro-2-furfurylidene)-3-amino-2-oxazolidone], nicarbazine (mixture of 4,4'-dinitrocarbanilide and 2-hydroxy-4,6-dimethyl-pyrimidine), 3,5-dinitro-o-toluamide and 1-(4-amino-2-n-propyl-5-pyrimidyl-methyl)-2-picolinium chloride, etc.

Many of the coccidiostats for poultry have disadvantages, such as disagreeable odor and taste, insufficient efficacy, too high a cost for the return or a poor tolerance shown by a retardation of growth or a lowering of egg production and of hatching. Also, the toxicity of some coccidiostats limits the amount which can be administered to poultry. The efficacy of certain coccidiostats is specific to certain breeds of poultry or to certain coccidies causing the infection.

It is an object of the invention to provide novel ingestible compositions for combatting coccidiosis in animals.

It is another object of the invention to provide a novel method of treating animals to reduce the incidence of coccidiosis.

These and other objects and advantages of the invention will become obvious from the following detailed description.

The novel compositions of the invention for combatting coccidiosis in animals are comprised of about 0.005 to 0.08% of a dithiocarbamate having the formula

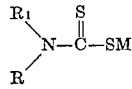

wherein R and $R_1$ are alkyl radicals having 1 to 6 carbon atoms and M is selected from the group consisting of hydrogen and an alkali metal and an ingestible carrier. Sodium diethyldithiocarbamate is particularly preferred for combatting acute and chronic coccidiosis in animals.

The coccidiostat activity of the compositions is evidenced by the absence of oocysts and a large reduction or elimination of mortality of the animals, of lesions and of the presence of blood in the excrements of the animals. Also, there is an improvement in the rate of food efficiency and in the rate of growth and of general state of health of the animals. The compositions not only combat coccidiosis during the period of administration but also develop an immunity in the treated animals to coccidiosis after suspension of the administration of the compositions. The compositions of the invention are not harmful to the metabolism or the organism of poultry and does not alter the taste of the animals when eaten.

The dialkyldithiocarbamates of the invention can be administered to the animals in any ingestible form. They can be incorporated into the animals' drinking water or into concentrates (premixes) in the form of pastes, small balls, tablets, granules, drinkable solutions or oral powders which contain one or more additional products or non-toxic adjuvants. The said concentrates can be sold as such and be diluted just before use.

The dialkyldithiocarbamates can also be added to solid commercial mixed feeds or feed supplements by grinding and intimately mixing the said compounds with solid ingestible materials, such as soy bean meal, peanut oil meal, powdered shells, bentonite, etc. The said compounds can also be dispersed in an ingestible oil with a non-toxic surface active agent and incorporating the resulting dispersed products into the feed or the compounds can be dissolved in a solvent, adding the solution to the desired feed mix and then eliminating the solvent by desiccation.

The novel method of the invention of treating animals to reduce the incident of coccidiosis comprises administering orally to the animals an effective amount of a dithiocarbamate having the formula

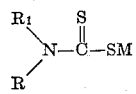

wherein R and $R_1$ are alkyl radicals having 1 to 6 carbon atoms and M is selected from the group consisting of hydrogen and an alkali metal.

In the following example there are described several preferred embodiments to illustrate the invention. However, it should be understood that the invention is not intended to be limited to the specific embodiments.

EXAMPLE I 15 parts by weight of sodium diethyldithiocarbamate were mechanically mixed with 85 parts by weight of de-oiled soybean meal to form a homogeneous concentrate. The said concentrate was dispersed in a commercial poultry feed paste to form poultry feeds having 0.025% (250 gm. per ton of feed) and 0.050% (500 gm. per ton of feed) of the sodium diethyldithiocarbamate.

Five lots of day-old chicks (32 chicks in each lot) were used in the following seven day test. One lot (A) of chicks were used as healthy controls being fed the poultry feed paste only. The remaining four lots were infected by direct inoculation of 50,000 sporulated oocysts of *Eimeria tenella* into the crop of each chick. One lot (B) was used as infected controls being fed the poultry feed paste only and one lot (C) was fed the poultry feed paste containing 0.0125% (125 gm. per ton of feed) of 3,5-dinitro-o-toluamide. The remaining two lots of chicks (D and E) were fed the poultry feed paste containing 0.025% and 0.05% of sodium diethyldithiocarbamate, respectively.

The coccidiostatic efficacy was judged by the following criteria:

M—mortality of the 32 chicks of each lot.
E.G. 5 and E.G. 7—general state of the chicks 5 days and 7 days after the inoculation on a scale from 0 to 3.
Sg 5, Sg 6 and Sg 7—presence of blood in the excrements 5, 6 and 7 days after the inoculation on a scale from 0 to 10.

L—lesions with a size scale from 0 to 6.
G.P.—gain in weight of the chicks in grams from the second day to the seventh day.
I.C.—consumption index or feed efficiency.

The said criteria are summarized in Table I.

Table I

| | M | E.G. | | Sg | | | L | G.P. | I.C. |
|---|---|---|---|---|---|---|---|---|---|
| | | 5 | 7 | 5 | 6 | 7 | | | |
| Lot A | 0 | 3.00 | 3.00 | 0 | 0 | 0 | 0 | 91.68 | 1.89 |
| Lot B | 20 | 1.00 | 0.47 | 8.00 | 8.00 | 7.25 | 5.22 | 52.12 | 2.61 |
| Lot C | 0 | 2.70 | 2.75 | 1.50 | 5.00 | 2.25 | 3.50 | 96.84 | 1.83 |
| Lot D | 0 | 2.18 | 2.62 | 0 | 0.62 | 1.00 | 1.22 | 96.22 | 1.87 |
| Lot E | 0 | 2.34 | 2.78 | 0 | 0.25 | 0 | 0.44 | 92.53 | 1.84 |

The results of Table I show the excellent coccidiostatic efficacy of the feed containing sodium diethyldithiocarbamate. The large reduction of lesions and the reduction of the amount of blood in the excrements are clearly better with the said compound as compared with the prior art coccidiostat which was utilized at its optimum dose.

EXAMPLE II

A second seven day test was conducted on eight lots of day-old chicks with 32 chicks in each lot using the same procedure as Example I. Lot A was used as healthy controls and Lot B was used as infected controls, both being fed the poultry feed per se. Infected Lot C was fed the poultry feed containing 0.0125% (125 gm. per ton of feed) of 3,5-dinitro-o-toluamide. Infected Lots D, E, F, G and H were fed the poultry feed containing 0.012%, 0.018%, 0.027%, 0.04% and 0.06% respectively of sodium diethyldithiocarbamate. The coccidiostat efficacy was determined as in Example I and the results are summarized in Table II.

Table II

| | M | E.G. | | Sg | | | L | G.P. | I.C. |
|---|---|---|---|---|---|---|---|---|---|
| | | 5 | 7 | 5 | 6 | 7 | | | |
| Lot A | 0 | 3 | 3 | 0 | 0 | 0 | 0 | 86.6 | 1.86 |
| Lot B | 14 | 0.92 | 0.87 | 8 | 8 | 7 | 4.87 | 59.2 | 2.24 |
| Lot C | 1 | 2.89 | 2.03 | 1.5 | 4.37 | 5.75 | 3.53 | 83.12 | 1.90 |
| Lot D | 3 | 2.37 | 1.78 | 3.87 | 7 | 5.87 | 3.84 | 77.2 | 1.99 |
| Lot E | 3 | 2.58 | 2.03 | 2.62 | 6.75 | 5.37 | 3.65 | 91.44 | 1.81 |
| Lot F | 0 | 2.75 | 2.41 | 0.50 | 2 | 3.25 | 1.84 | 98.75 | 1.72 |
| Lot G | 0 | 2.69 | 2.50 | 0 | 0 | 0 | 0.78 | 99.20 | 1.68 |
| Lot H | 0 | 2.67 | 2.53 | 0 | 0 | 0 | 0 | 103.30 | 1. |

The results of Table II show that the coccidiostatic activity of sodium diethyldithiocarbamate is *excellent* in the case of Lots F, G and H which have no mortality, no or a little blood in the excrements, very small or no lesions and a very large gain of weight, excellent index of consumption and a very clear coccidiostatic activity in the case of Lots D and E which have an activity of the same order as that observed by Lot C using the prior art anti-coccidial compound at its optimum concentration. The anti-coccidial efficacy observed in particular for Lot F, corresponding to a concentration of 270 g. of sodium diethyldithiocarbamate per ton of feed is very superior to that observed for Lot C, corresponding to the anti-coccidiocic compound of the prior art utilized at its optimum concentration.

From the point of view of zootechnical efficacy, sodium diethyldithiocarbamate has a good growth factor, starting from a dose of 180 g. of the active principal per ton of feed (Lot E), because the gains of weight of the animals are in effect superior to those of the healthy animals, and increases as the level of incorporation of the compound in the feed is increased. The feed efficiency varies in the same sense. The toleration of sodium diethyldithiocarbamate is excellent even at elevated doses (600 g. of active principal per ton of feed, Lot H). Sodium diethyldithiocarbamate gives a complete anti-coccidial effect while being a very efficacious growth factor and it can be utilized at much greater doses above the efficacy minimum without provoking signs of toxicity contrary to that which occurs for the usual anti-coccidial compounds.

Various modifications of the compositions of the invention may be made without departing from the spirit or scope thereof and it is to be understood that the invention is to be limited only as defined in the appended claims.

I claim:

1. Compositions for reducing the incidence of coccidiosis in animals subject to coccidiosis infection comprising 0.005 to 0.08% of a dithiocarbamate of the formula

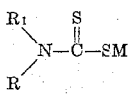

wherein R and $R_1$ are alkyl of 1 to 6 carbon atoms and M is an alkali metal and a food substance for the said animals.

2. The compositions of claim 1 wherein the dithiocarbamate is sodium diethyldithiocarbamate.

3. A method of treating animals subject to coccidiosis infection to reduce the incidence thereof which comprises administering orally to the animals an effective amount of a dithiocarbamate having the formula

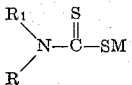

wherein R and $R_1$ are alkyl having 1 to 6 carbon atoms and M is an alkali metal.

4. A method of treating animals subject to coccidiosis infection to reduce the incidence thereof which comprises administering orally to the animals an effective amount of sodium diethyldithiocarbamate.

References Cited by the Examiner
UNITED STATES PATENTS 2,567,358 9/51 Waletzky _____ 167—53.1
3,051,625 8/62 Rao _____ 167—22

JULIAN S. LEVITT, *Primary Examiner.*

F. CACCIAPAGLIA, Jr., LEWIS GOTTS, *Examiners.*